May 3, 1966 B. D. LOUGHLIN 3,249,694
BLACK LEVEL STABILIZATION SYSTEM FOR A TELEVISION RECEIVER
Filed Aug. 9, 1962 3 Sheets-Sheet 2

United States Patent Office 3,249,694
Patented May 3, 1966

3,249,694
BLACK LEVEL STABILIZATION SYSTEM FOR A TELEVISION RECEIVER

Bernard D. Loughlin, Huntington, N.Y., assignor to Hazeltine Research, Inc., a corporation of Illinois
Filed Aug. 9, 1962, Ser. No. 215,964
11 Claims. (Cl. 178—7.5)

This invention relates to a black level stabilization system for a television receiver. More particularly, improved forms of circuits are described for implementing, in a novel manner, the dual mode type of black level stabilization described in copending application Serial No. 215,968, filed August 9, 1962.

In a television receiver, black level stabilization, as the phrase is used in this specification and in the appended claims, may be defined as the technique of maintaining the direct-current (D.-C.) component in the video signal (corresponding to the average brightness of the televised scene) at the input of the picture tube in such a way that the level of the signal corresponding to black in the scene just reaches black in the reproduced image for varying values of average scene brightness. The present invention is described herein in connection with one form of black level stabilization in which the D.-C. component of the video signal is retained by means of D.-C. coupling from the video detector through the video amplifier to the picture tube. This is in contrast to alternating-current (A.-C.) coupling in which the D.-C. component of the video signal is prevented from reaching the picture tube and a fixed D.-C. bias is inserted at the picture tube by the viewer by means of the brightness control.

As is explained in the aforementioned application, even though it may be considered desirable to fully retain the D.-C. component in the reproduced image because of the theoretical improvement it presents in the quality of the reproduced image, as compared to A.-C. coupling or pseudo D.-C. coupling wherein only a percentage of the video signal D.-C. component, significantly less than 100%, is coupled to the picture tube, there are nevertheless certain practical difficulties which make such full D.-C. coupling undesirable. For example, stable D.-C. coupled amplifier stages are relatively difficult and expensive to provide commercially. Also, the high D.-C. beam currents which would be required on scenes of high average brightness could overload the type of high voltage supply circuit presently being used in television receivers. This latter problem would be observed by the viewer as improper horizontal scanning operation and as drastic changes in picture size, both horizontally and vertically. Thus, a novel solution to this problem, along with several embodiments, are proposed in the above-mentioned application in which black level stabilization is employed only on scenes of low average brightness with the black level performance being allowed to substantially deteriorate toward the equivalent of A.-C. coupling on scenes of high average brightness. The transition point is preferably selected to correspond to the maximum average beam current which can be drawn without incurring the aforementioned observable overloading effects.

It is, therefore, an object of the present invention to provide an image-reproducing system with a novel form of black level stabilization circuit, specifically a D.-C. coupling circuit that combines the advantages of D.-C. coupling circuits with those of A.-C. coupling circuits to improve the quality of picture reproduction, at a minimum of cost and circuit complexity over those receivers having pure A.-C. coupled circuits or D.-C. coupled circuits employing either full D.-C. coupling or a percentage of D.-C. coupling.

Thus, in accordance with the invention, there is provided a black level stabilization system for a television receiver adapted to receive a television signal which has a D.-C. component representative of average scene brightness. The system, in part, comprises image-reproducing apparatus which includes a cathode-ray tube and an external beam current path having a resistance through which the beam current is arranged to flow. The system further includes means for coupling the video signal to the cathode-ray tube, the coupling means including a nonlinear control means responsive to the voltage across the resistance for enabling the coupling means to faithfully translate the D.-C. component of the video signal to the cathode-ray tube on scenes of low average brightness and for preventing the coupling means from faithfully translating the D.-C. component to the cathode-ray tube on scenes of high average brightness. With this arrangement, black level stabilization is achieved in the reproduced image only on scenes of low average brightness in a simple, inexpensive, and effective manner.

For a better understanding of the present invention, together with other and further objects thereof, reference is had to the following description, taken in connection with the accompanying drawings, and its scope will be pointed out in the appended claims.

Referring to the drawings:

FIG. 1 is a combination block and circuit diagram of a television receiver including an image-reproducing system constructed in accordance with the present invention;

FIGS. 2*a* and 2*b* are diagrams of television signal waveforms used in explaining the operation of the FIG. 1 receiver;

*General*

Figure 1:
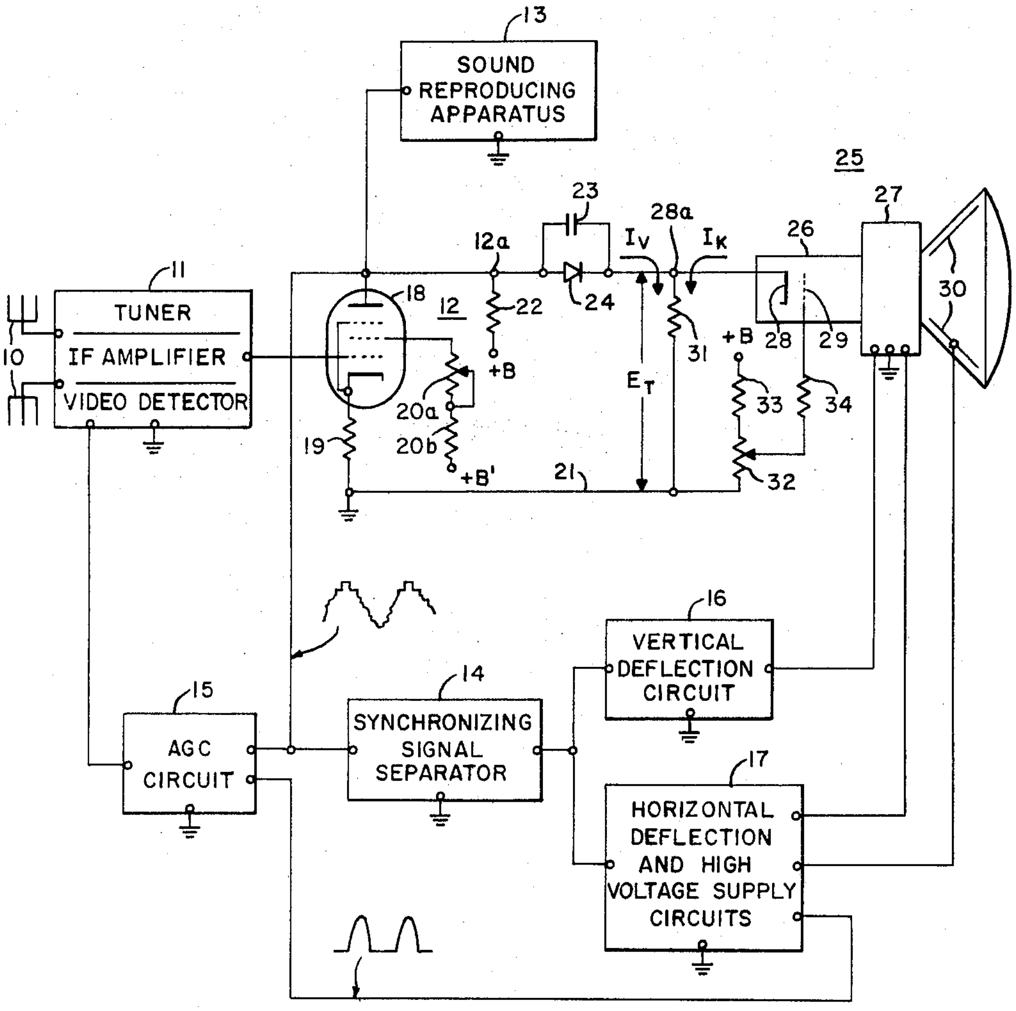

Referring to FIG. 1, there is shown a television receiver embodying a black level stabilization system constructed in accordance with one form of the present invention. Thus, with the exception of the black level stabilization system, hereinafter described, the receiver may be of conventional construction unless otherwise noted. The receiver includes an antenna 10 connected to the input of unit 11 which is made up of the usual tuner, intermediate-frequency (IF) amplifier, and video detector stages coupled in series and in that order. The output of the video detector is D.-C. coupled, with sync pulses extending in the negative direction, to the control grid of video amplifier 12, wherein it is amplified, reversed in polarity, and applied to picture tube 26 in a manner to be described hereinafter and also to sound-reproducing apparatus 13, synchronizing signal separator 14, and automatic-gain-control (AGC) circuit 15. The AGC circuit 15 may be of any conventional construction, for example a keyed AGC circuit, to derive an AGC effect from the sync pulse peaks which is then applied to the tuner and IF amplifier stages in unit 11 to maintain the peak amplitude of the video signal at the output of the video detector within a small range of variations despite a substantially greater range of variations in the signal strength as received at antenna 10. Alternatively, an improved form of AGC circuit which derives the control effect from blacking level in the composite video signal may be used. An example of the latter type of AGC circuit is described in application Serial No. 223,493, filed September 13, 1962, and abandoned December 24, 1964.

The sync pulses in the composite signal are stripped in the synchronizing signal separator 14 and applied to the vertical and horizontal deflection circuits 16 and 17 wherein beam deflection signals are generated and applied to the deflection yoke 27 of image-reproducing apparatus 25. Additionally, unit 17 also includes a high voltage supply circuit at the output of the horizontal deflection circuit which provides a voltage of the order of 20,000 volts to the high voltage anode 30 of cathode-ray tube 26. Flyback pulses, from a third output terminal of unit 17, are coupled to AGC circuit 15 for deriving the AGC effect previously described.

*Black level stabilization system of FIG. 1 receiver*

Essentially, the black level stabilization system of the present invention is a D-C coupled image-reproducing system on scenes of low average brightness, until it is converted to approximately an A-C coupled image-reproducing system on scenes of high average brightness. This conversion from D-C to effectively A-C coupling is produced by means of a nonlinear control element which performs its control action in response to the amount of beam current flowing in the image-reproducing device as indicated by the voltage this beam current produces across a resistance inserted in the external beam current path.

Thus, in the black level stabilization system of the present invention, there is provided image-reproducing apparatus including a cathode-ray tube with an external beam current path having a resistance through which the beam current is arranged to flow when an image is being reproduced. In FIG. 1, image-reproducing apparatus 25 includes a cathode-ray tube 26, hereinafter referred to as a picture tube, with its external beam current path consisting of the connection from high voltage anode 30 through the high voltage supply circuit in unit 17 in series with the cathode resistor 31 to the cathode 28. Cathode resistor 31 is the aforementioned resistance through which the beam current is arranged to flow. Additionally, image-reproducing apparatus 25 includes a brightness control circuit by means of which the viewer is able to adjust the grid-cathode bias on the picture tube 26. To this end, the control grid 29 is connected through resistor 34 to the movable tap of potentiometer 32 serving as the adjustable portion of a voltage divider network 32, 33 connected across a voltage source +B.

There is also provided in the system of the present invention means for coupling the video signal appearing at the output of the video detector in unit 11 to the picture tube 26. In FIG. 1 this coupling means comprises the circuit loop including video amplifier 12 and its associated elements, coupling network 23, 24, wire 21, and the remaining connections to the control grid 29, and cathode 28 of picture tube 26. In accordance with the teachings of the present invention, the coupling means just described includes a nonlinear control element, diode 24, responsive to the voltage across resistor 31, for enabling the coupling means to faithfully translate the D-C component of the applied video signal to the picture tube 26 on scenes of low average brightness and for preventing faithful translation of the D-C component on scenes of high average brightness.

In this context, faithful translation of the D-C component corresponds to true black level stabilization; while preventing such faithful translation corresponds to what has previously been called "approximateley A-C coupling." It should be understood that, during this so-called A-C coupled operating mode, a relatively small percentage of the D-C component might still be translated to the picture tube 26. However, the significant point is that, in this mode of operation, true black level stabilization is not permitted to occur.

For the purpose of this specification and the following claims, the relative terms "low" and "high" average brightness levels are intended to be referenced with respect to each other. Therefore, the terms are mutually exclusive and are meant to apply respectively to two broad ranges of brightness levels covering the entire gamut of average scene brightness levels. The difficulty with any attempt to use more specific terminology is that there is no fixed level of average scene brightness corresponding to the point at which the transition from D.-C. coupled operation to A.-C. coupled operation should desirably occur in all cases. The desired value of the transition point depends, for example, on the maximum picture tube beam current that can be drawn without causing overloading of the high voltage supply circuit, such overloading being observable as changes in picture size and brightness. As such, it would be a function not only of receiver construction, but also, due to the nonlinear beam current characteristic of the picture tube, a function of scene content. In general, however, a suitable transition point is one which occurs when the D.-C. component of a video signal resulting from a uniform grey field scene is about fifty percent of the maximum D.-C. component which would occur on an all white scene.

Figure 2A:
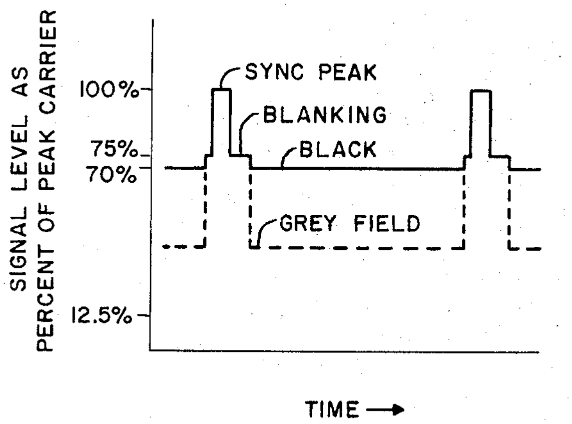
Figure 2B:
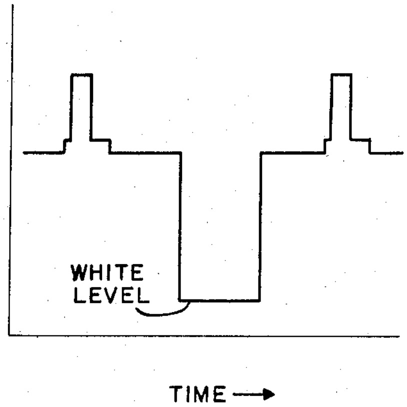
Figure 3:
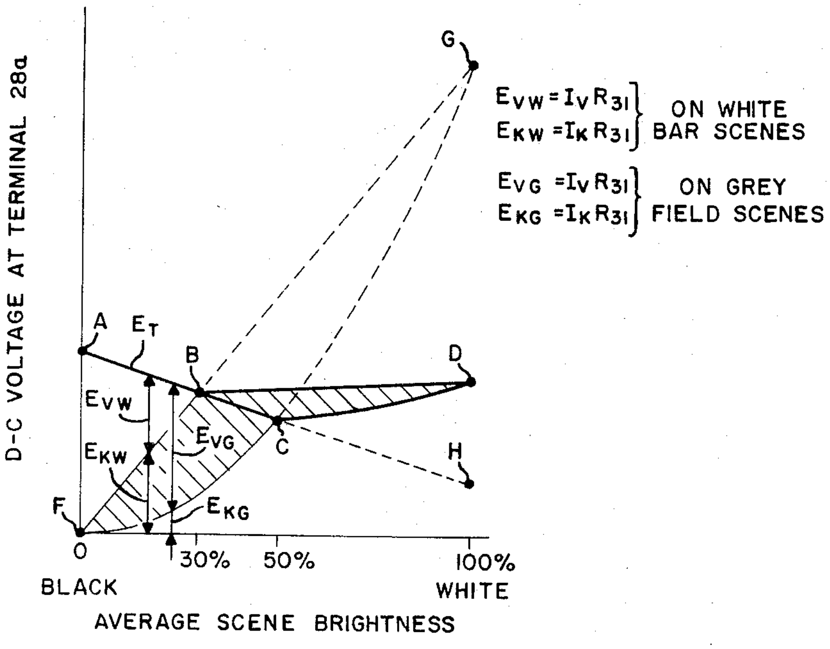
FIG. 3 is a chart of voltage variations occurring in the receiver of FIG. 1 as a function of average scene brightness and which is used in explaining the operation thereof.

The operation of the black level stabilization system of FIG. 1 will now be considered in connection with FIGS. 2*a*, 2*b*, and 3. FIGS. 2*a* and 2*b* show three different forms of applied video signals; while FIG. 3 shows, in an idealized manner, the effect these different video signals have on the voltage produced across picture tube cathode resistor 31 at cathode terminal **28*a*. In FIG. 3, line A–H corresponds to the D.-C. voltage variations at the video output terminal 12*a* as a function of average scene brightness. Line F–B–G and curve F–C–G show the voltage variations across cathode resistor 31** due to the average beam current $I_K$ produced by two different types of applied video signals, as will be explained more fully hereinafter, the dotted portions B–G and C–G merely being extrapolations of portions F–B and F–C, respectively.

It will be initially assumed that the applied video signals represents a uniform black scene, as represented by the signal in solid outline in FIG. 2*a*, and that the grid-cathode bias has been set by means of potentiometer 32 to just reach cutoff of the beam current $I_K$. In this condition, i.e. $I_K=0$, diode 24 is forward-biased to conduction and, since the voltage drop across the diode is negligible, the current $I_V$ flowing through the picture tube cathode resistor 31 from the video amplifier plate load resistor 22 through diode 24 will be of such value as to make the total voltage drop $E_T$ across the resistor 31, and therefore the voltage at cathode terminal **28*a*, substantially equal to the video plate voltage at terminal 12*a*; thereby providing D.-C. coupling from the video amplifier 12 to the picture tube 26**. This condition of operation corresponds to point A in FIG. 3.

Subsequently, as the video signal changes to low average brightness levels, the video amplifier 12 remains D.-C. coupled to picture tube 26; and, as a result, average beam current $I_K$ begins to flow. Consequently, the total voltage across $E_T$ at terminal **28*a* is made up of two components. One component $E_K$ is produced by the beam current $I_K$ and steadily increases, in a manner to be described, as the average scene brightness increases. The other component $E_V$ is produced by the D.-C. current $I_V$ and steadily decreases due to both the decrease in D.-C. voltage at terminal 12*a*** and the presence of the component $E_K$.

Because of the square-law characteristic of picture tube 26, the manner in which voltage component $E_K$ will vary depends on the type of scene being televised. Thus, if a uniform grey field scene of varying amplitude is being televised, the applied video signal will be as shown in dotted outline in FIG. 2*a*, and the corresponding variation $E_{KG}$ in the voltage component produced by beam current $I_K$ will be along curve F–C in FIG. 3. On the other hand, if a white bar scene of varying width is televised, as represented by the signal shown in FIG. 2*b*, the voltage component produced by the beam current $I_K$ would vary along line F–B. Actually, these two types of scenes represent extreme conditions of scene content. With the majority of televised scenes, the voltage component variations produced by beam current $I_K$ would fall somewhere in the shaded area between curve F–C and line F–B. In any event, the total composite voltage $E_T$ at terminal 28*a* decrease along line A–B following the corresponding decreasing voltage at video amplifier output terminal 12*a*, due to the D.-C. coupling through diode 24. The significance of this discussion about the effect of the scene content has on component $E_K$ is to show one reason why the transition point cannot be specified in a fixed manner.

As the average scene brightness continues to increase with a corresponding increase in beam current $I_K$, a point is reached somewhere on line B–C, depending on the type of scene being televised, where the D.-C. voltage $E_T$ produced at cathode terminal 28*a* by just the beam current $I_K$ alone equals the D.-C. voltage at video output terminal 12*a*. With any further increase in average scene brightness, the D.-C. voltage at terminal 12*a* continues to fall along dotted line C–H while the D.-C. voltage at terminal 28*a* remains essentially constant somewhere within the shaded area bounded by line B–D and curve C–D, again depending on the particular content of the televised scene. Thus, since the D.-C. voltage at video amplifier output terminal 12*a* is negative with respect to the D.-C. voltage at terminal 28*a*, on these high average scene brightness levels, diode 24 is back-biased and thereby presents an open circuit for the D.-C. component of the applied video signal. Under this condition, A.-C. coupling from video amplifier 12 to picture tube 26 exists by virtue of capacitor 23.

Assuming a fixed contrast control setting by variable resistor 20*a* in the video amplifier 12 and, except for the aforementioned effect of scene content, the value of resistor 31 essentially determines the beam current at which the transition from D-C to A-C coupling occurs. The larger the resistance, the lower the current at transition and, consequently, the lower the average scene brightness will be at transition. Preferably, the value of resistor 31 is selected to cause transition to occur at a beam current slightly lower than that which would produce objectionable overloading of the high voltage power supply. As previously explained, this point of objectionable overload would be determined by the point at which objectionable changes in image size and brightness would occur. These effects are well-known to those skilled in the art and, therefore, the transition level can be readily determined for any given television receiver design.

While applicant does not wish to be limited to any particular set of circuit constants, the following have proved useful in the system of FIG. 1:

| | |
|---|---|
| Resistor **19** ______ohms__ | 10 |
| Resistor **20***b* ______do____ | 470 |
| Resistor **22** ______kilohms__ | 5.4 |
| Resistor **31** ______do____ | 680 |
| Resistor **33** ______do____ | 100 |
| Resistor **34** ______do____ | 150 |
| Potentiometer **20***a* ______kilohms (max.)__ | 15 |
| Potentiometer **32** ______do____ | 100 |
| Capacitor **23** ______microfarads__ | 0.22 |
| Vacuum tube **18** (pentode section) ______ | 6AU8 |
| Diode **24** ______ | 1N34A |
| Picture tube **26** ______ | 21CEP4 |
| Potential supply +B ______volts__ | 265 |
| Potential supply +B' ______do____ | 130 |

A unique feature of the black level stabilization system described with respect to FIG. 1 is that because the coupling means is driving the cathode 28 of picture tube 26, the diode 24 can conveniently serve the dual functions of converting the coupling means from a D-C to effectively an A-C coupled circuit and of actually translating the D-C component when the coupling means is operating in the D-C coupled mode. However, in accordance with the broadest aspect of the present invention, it is not essential that the diode serve as both the control element and a signal-translating element. An embodiment will now be considered, with reference to FIG. 4, in which the diode serves only as a control element, although due to its significant effect on the coupling means, it may properly be considered as a part thereof.

Figure 4:
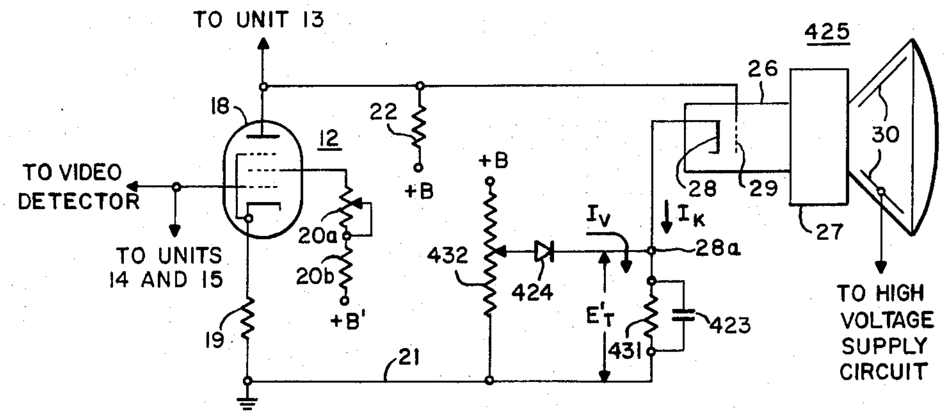
FIG. 4 is a modification of the portion of the FIG. 1 receiver embodying the present invention.

*Black level stabilization system of FIG. 4*

In FIG. 4, a portion of a television receiver is shown embodying a black level stabilization system constructed in accordance with the present invention, in which the video signal is applied directly to the control grid 29 of picture tube 26 instead of to the cathode as in FIG. 1. For simplicity, the elements in FIG. 4 which are identical to corresponding elements in FIG. 1 carry the same reference numerals, while the prefix numeral "4" is added to the reference numerals of those elements in FIG. 4 which have functions similar to corresponding elements in FIG. 1. Furthermore, since the picture tube 26 is being grid driven, the video signal is applied with sync pulses extending negatively. Thus units 14 and 15 are driven from the grid of video amplifier tube 18 when the video signal appears with sync pulses extending positively.

Thus, in the system of FIG. 4, the external beam current path for the image-reproducing apparatus 425 consists of the connections from cathode 28 through cathode resistor 431, and the high voltage supply circuit, in series, to the high voltage anode 30. The coupling means includes the circuit loop comprising, on one side, a direct connection to the picture tube control grid 29 and, on the return side, video amplifier cathode resistor 19, wire 21, picture tube cathode resistor 431 in parallel with brightness control potentiometer 432 and diode 424, in series, to the picture tube cathode 28. In addition, the circuit loop includes capacitor 423 connected in parallel across cathode resistor 431.

Figure 5:
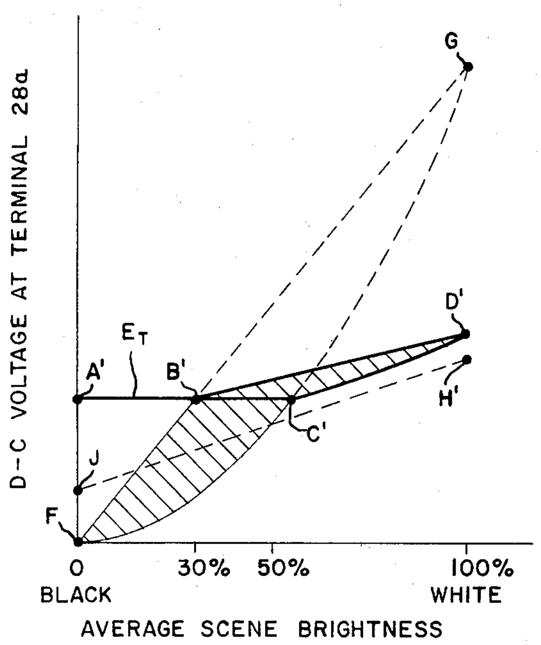
FIG. 5 is a chart of voltage variations in the circuit of FIG. 4 similar to the chart of FIG. 3.

The operation of the FIG. 4 system will be considered with reference to FIGS. 2*a*, 2*b*, and 5, the latter figure being an operating characteristic diagram similar to that of FIG. 3. Thus, assuming that a video signal representing a uniform black field, as shown in FIG. 2*a*, is applied with negative-going sync pulses to the control grid 29, and that potentiometer 432 is adjusted for zero beam current $I_K$, the current $I_V$ through the forward-biased diode 424 is sufficient to make the D-C voltage $E_T$ at terminal 28*a* substantially equal to the voltage at the movable tap of potentiometer 432. This corresponds to point A' on the diagram of FIG. 5. Dotted line J–H' in FIG. 5 shows the manner in which the D-C voltage on control grid 29 varies with average scene brightness. Thus, as scene brightness increases, a voltage component is developed across resistor 431 by beam current $I_K$ in occurs within the shaded area bounded by line F–B' and the manner previously described so that the value thereof curve F–C'. On low levels of average scene brightness, with the increase in beam current $I_K$, the current $I_V$ must decrease since the D-C voltage $E_T$ at terminal 28*a* must remain substantially equal to the fixed potentiometer voltage due to the negligible voltage drop across diode 424.

Finally, a point is reached along line B'–C' where the voltage $E_T$, as produced by beam current $I_K$ alone, is substantially equal to the voltage at potentiometer 432. Up to this point, the presence of resistor 431 in the cathode circuit of picture tube 26 has had very little effect on the black level operation of the system. That is to say, the voltage at terminal 28*a* is maintained substantially fixed due to the presence of the forward-biased diode 424, and any variations in the D-C grid-cathode bias on the picture tube 26 are therefore a function of the D-C component of the applied viedo signal. Consequently, the system operates in a D-C coupled manner on these scenes of low average brightness. It will be appreciated that because of the requirement that the voltage at the movable tap of potentiometer 432 remain substantially fixed, the resistance value thereof should be substantially smaller than the value of the cathode resistor 431, for example of the order of one-tenth the value of resistor 431.

As the average scene brightness increases beyond this point, the further increase in beam current $I_K$ raises the D-C voltage at terminal 28*a* positive with respect to the potentiometer voltage, back-biasing diode 424 and thereby removing the fixed voltage from terminal 28*a*. Under this condition, the cathode resistor 431 has a substantial effect on the black level operation of the system. This is because it now presents a large amount of D-C degeneration in the cathode circuit relative to the substantially smaller amount of A-C degeneration through bypass capacitor 423. In accordance with the D-C degenerative operation, the voltage at terminal 28*a* rises slightly with increasing average scene brightness within the shaded area the grid bias along line J–H′. However, the resulting bounded by line B′–D′ and curve C′–D′ so as to follow increase in average beam current $I_K$ is small as compared with the substantial variations which would occur with full D-C coupling upwards to point G in FIG. 5. Because of this increase in beam current in the A-C coupled mode, the value of resistor 431 should be chosen, ideally, so that the maximum permissible average beam current at point D′ in FIG. 5 is just under the value which could cause observable overloading effects. However, since these extremely high levels of average scene brightness are rarely, if ever, achieved in actual practice, a considerable amount of tolerance may be allowed.

In summary, it can be said that on scenes of high average brightness the system of FIG. 4 is effectively an A-C coupled system, despite the direct connection from video amplifier 12 to picture tube 26 due to the fact that there is a large amount of D-C degeneration in the cathode circuit relative to the small amount of A-C degeneration through bypass capacitor 423. It is as though the only significant element in this return path of the coupling means were the capacitor. However, on low average scene brightness levels, the forward biasing of diode 424 effectively shorts out the high D-C degenerative path, thereby restoring the coupling means to a D-C coupled mode.

It should be emphasized that the important factor in D-C coupling is that the D-C component of the video signal appear between the control grid 29 and cathode 28 of the picture tube 26. In this respect, diode 24 of FIG. 1 and diode 424 of FIG. 4 serve identical functions; diode 24 by translating the D-C component to the cathode where the control grid is at a fixed potential, and diode 424 by holding the cathode at a fixed potential while the control grid varies in accordance with the video signal D-C component.

Furthermore, diodes 24 and 424 both respond to the voltage across cathode resistors 31 and 431, respectively, to convert the coupling means from a D-C coupled mode on scenes of low average brightness to effect an A-C coupled mode on scenes of high average brightness; diode 24 by blocking the D-C component from the cathode, thereby maintaining a relatively fixed grid-cathode bias on high average brightness scenes, and diode 424 by permitting the cathode to vary along with the control grid, thereby maintaining a relatively fixed grid-cathode bias.

The invention is not limited to the use of diodes as heretofore described as the only possible control element. For example, an electrolytic capacitor connected in reverse polarity to the way it would normally be connected may be used in place of the diode, since its effective shunt resistance when reverse biased, i.e. on low levels of average scene brightness, is substantially lower in value than when it is correctly biased, i.e. on scenes of high average brightness levels. In the case of FIG. 1 this reverse-connected electrolytic capacitor could be connected with its negative terminal toward the plate of the video amplifier 12 and is positive terminal toward the cathode 28 of picture tube 26 and could conveniently take the place of both diode 24 and capacitor 23 since the capacitance value remains the same regardless of its polarity of connection.

In a further modification, a semiconductor junction diode may be coupled in reverse polarity to that shown in either of FIGS. 1 or 4 such that on scenes of high average brightness the diode operates over its back-bias region the same as previously described; but on the scenes of low average brightness, the diode would operate over its avalanche breakdown region rather than the forward-bias region. In the case of the FIG. 1 system, this would have the advantage of inherently providing a fixed D-C drop from the video amplifier terminal 12*a* to the cathode terminal 28*a*. This, of course, would not adversely affect the translation of the D-C component of the video signal to the picture tube since only the variations thereof are of any significance. However, it would have the advantage of permitting the operation of the cathode at a lower fixed D-C bias level, thereby lowering the filament-to-cathode voltage and possibility doing away with a filament transformer which might be required in the FIG. 1 system.

While the simplicity of the present invention is considered to make it especially attractive for low-cost television receivers, it is felt that the invention is equally attractive for use in more expensive receiver designs. This is because of the fact that not only are overload problems solved by this circuit due to the two-mode coupling arrangement, but also there is a subjective advantage in that it retains the advantage of D-C coupling at brightness levels where it is most desirable, i.e. low levels, while not producing the objectionably high image brightness resulting with full D-C coupling on high scene brightness levels which may cause eye fatigue to the viewer.

While there have been described what are, at present, considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A black level stabilization system for a television receiver adapted to receive a television signal which has a D.C. component representative of average scene brightness, the system comprising:

image-reproducing apparatus including a cathode-ray tube with an external beam current path having a resistance through which the beam current is arranged to flow;

and means for coupling the video signal to the cathode-ray tube, the coupling means including a nonlinear control means responsive to the voltage across said resistance for enabling the coupling means to faithfully translate said D.C. component to the cathode-ray tube on scenes of low average brightness and for preventing the coupling means from faithfully translating the D.C. component to the cathode-ray tube on scenes of high average brightness;

whereby black level stabilization is achieved in the reproduced image only on scenes of low average brightness.

2. A black level stabilization system in accordance with claim 1, in which said external beam current path includes an energy source and in which the value of said resistance is such as to cause said faithful translation to cease at a maximum value of average beam current which can be drawn without causing significant overloading of said energy source.

3. A black level stabilization system in accordance with claim 1, in which said nonlinear control means is adapted both to control said coupling means and to translate the D.C. component of said video signal to the cathode-ray tube.

4. A black level stabilization system in accordance with claim 1, in which said nonlinear control means is a unidirectionally conductive device.

5. A black level stabilization system in accordance with claim 4, in which said unidirectionally conductive device is a diode adapted to operate in a forward-biased condition on said scenes of low average brightness.

6. A black level stabilization system in accordance with claim 4, in which said unidirectionally conductive device is a semiconductor diode adapted to operate in a condition of avalanche breakdown on said scenes of low average brightness.

7. A black level stabilization system in accordance with claim 1, in which said nonlinear control means consists of an electrolytic capacitor.

8. An image-reproducing system for a television receiver comprising:

means for supplying a composite video signal having A.C. components representative of instantaneous variations in scene brightness and a D.C. component representative of average scene brightness and which may vary from scene to scene;

means including a beam current path for reproducing an image from the composite video signal;

and means for coupling the video signal from said supply means to the image-reproducing means, said coupling means including a path having a nonlinear signal-translating device responsive to variations of current in said beam current path and adapted to faithfully translate said D.C. component and any variations thereof during scenes of low average brightness and to prevent said faithful translation on scenes of high average brightness;

whereby black level stabilization is achieved in the reproduced image only on scenes of low average brightness.

9. A black level stabilization system in accordance with claim 8, in which said nonlinear device consists of an electrolytic capacitor.

10. A black level stabilization system in accordance with claim 8, in which said coupling means also includes a second path for translating said A.C. components and for blocking said D.C. component.

11. A black level stabilization system in accordance with claim 10, in which said second path comprises a capacitive coupling and in which said nonlinear device is a diode connected in parallel across said capacitive coupling.

References Cited by the Examiner

UNITED STATES PATENTS

| | | | |
|---|---|---|---|
| 2,832,824 | 4/1958 | Oakley | 178—7.5 |
| 2,862,052 | 11/1958 | Seright | 178—7.3 |
| 3,028,509 | 4/1962 | Teltscher et al. | 330—40 |

DAVID G. REDINBAUGH, *Primary Examiner.*

J. A. O'BRIEN, J. McHUGH, *Assistant Examiners.*